(12) United States Patent
Shin et al.

(10) Patent No.: US 11,091,017 B2
(45) Date of Patent: Aug. 17, 2021

(54) DOWNWARD MOVEMENT SPACING TYPE BATTERY PACK MOUNTING MODULE UPON SIDE COLLISION OF VEHICLE

(71) Applicants: Hyundai Motor Company, Seoul (KR); Kia Motors Corporation, Seoul (KR)

(72) Inventors: Seong-Su Shin, Seoul (KR); Seung-Min Kang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 31 days.

(21) Appl. No.: 16/826,814

(22) Filed: Mar. 23, 2020

(65) Prior Publication Data
US 2021/0146763 A1 May 20, 2021

(30) Foreign Application Priority Data
Nov. 14, 2019 (KR) ........................ 10-2019-0146034

(51) Int. Cl.
*B60K 1/04* (2019.01)
*B60L 50/60* (2019.01)
(Continued)

(52) U.S. Cl.
CPC ................ *B60K 1/04* (2013.01); *B60L 50/66* (2019.02); *B60K 6/28* (2013.01);
(Continued)

(58) Field of Classification Search
CPC ............ B60L 50/64; B60L 50/66; B60K 1/04
See application file for complete search history.

(56) References Cited

U.S. PATENT DOCUMENTS

| 7,066,531 | B2 * | 6/2006 | Tomita | B62D 21/152 |
| | | | | 180/68.5 |
| 8,839,895 | B2 * | 9/2014 | Kato | H01M 50/20 |
| | | | | 180/68.5 |

(Continued)

FOREIGN PATENT DOCUMENTS

| EP | 2805875 A1 | 11/2014 |
| JP | 07117726 A | 5/1995 |

(Continued)

OTHER PUBLICATIONS

European Patent Office, Extended European Search Report dated Apr. 28, 2021, issued in EP Application No. 20165850.7, 7 pages.

*Primary Examiner* — John D Walters
*Assistant Examiner* — James J Triggs
(74) *Attorney, Agent, or Firm* — Slater Matsil, LLP

(57) ABSTRACT

A battery pack mounting module for a vehicle is provided. The battery pack mounting module includes a seating flange fixed to a lower portion of a side sill, a fixing flange fixed to a battery pack panel under a battery pack, a mounting arm positioned between the seating flange and the fixing flange, and a plastic hinge A and a plastic hinge B formed at both sides of the mounting arm, wherein when a collision occurs on a side surface of the vehicle, the battery pack is configured to perform a downward movement by deformation of the plastic hinge A and the plastic hinge B to induce an avoidance behavior trajectory by a rotation motion of the mounting arm to avoid a collision between the battery pack and the side sill.

20 Claims, 8 Drawing Sheets

(51) Int. Cl.
 *B60K 6/28* (2007.10)
 *B62D 25/20* (2006.01)

(52) U.S. Cl.
 CPC ... *B60K 2001/0438* (2013.01); *B60Y 2200/91* (2013.01); *B60Y 2200/92* (2013.01); *B62D 25/20* (2013.01)

(56) References Cited

U.S. PATENT DOCUMENTS

| | | | |
|---|---|---|---|
| 9,205,872 B2 * | 12/2015 | Okada | B62D 25/02 |
| 9,505,442 B2 * | 11/2016 | Wu | B60K 1/04 |
| 9,561,824 B2 * | 2/2017 | Tamaoki | B62D 21/02 |
| 2014/0338997 A1 | 11/2014 | Okada et al. | |

FOREIGN PATENT DOCUMENTS

| | | | |
|---|---|---|---|
| JP | 2013116342 A | 6/2013 | |
| JP | 6406275 B2 | 10/2018 | |

* cited by examiner

SECTION A-A

DOWNWARD MOVEMENT SPACING TYPE BATTERY PACK MOUNTING MODULE UPON SIDE COLLISION OF VEHICLE

CROSS-REFERENCE TO RELATED APPLICATIONS

This application claims priority to Korean Patent Application No. 10-2019-0146034, filed on Nov. 14, 2019, which application is hereby incorporated herein by reference.

TECHNICAL FIELD

The present disclosure relates to a battery pack mounting module.

BACKGROUND

In general, an eco-friendly vehicle applying an electric motor constitutes a high voltage battery pack for driving a motor as a plurality of battery cells to be mounted under a vehicle body.

The battery pack mounting method is referred to as a battery mounting under center floor structure, and the battery mounting under center floor structure is a method of positioning a battery pack by using the lower site of the center floor of an under floor panel contacting the inside of the side sill which is attached to sites of A, B, and C pillars to form the side surface of a vehicle body.

Furthermore, the battery mounting under center floor structure applies a side sill extruded material to comply with the High Voltage Safety Regulation (FMVSS 301), and the side sill extruded material prevents the battery pack from being completely detached from the vehicle body while avoiding the intrusion of the side sill due to the side collision.

Unlike the accordion type axial deformation of the main member in the front/rear collisions, the side sill extruded material is disposed with the largest number of extruded material groups in a collision space by using a bending deformation method for absorbing/dispersing the collision energy. Therefore, the side sill extruded material absorbs/disperses the collision energy in the side collision situation to protect the battery cell from damage.

Therefore, an Electric Vehicle (EV) and a Mild Hybrid Electric Vehicle (MHEV) applying a Mild Hybrid Starter & Generator (MHSG), which are eco-friendly vehicles, may comply with the High Voltage Safety Regulation (FMVSS 301) by applying the battery mounting under center floor structure.

The contents described in the Background are to help the understanding of the background of the present disclosure, and may include what is not previously known to those skilled in the art to which the present disclosure pertains.

SUMMARY

The present disclosure relates to a battery pack mounting module. Particular embodiments relate to a downward movement spacing type battery pack mounting module, which prevents damage and detachment while preventing a battery pack from contacting a side sill upon a side collision applied from the outside to easily satisfy the High Voltage Safety Regulation (FMVSS 301).

Since the battery mounting under center floor structure uses bending deformation of a side sill and an extruded material to protect a battery pack upon the side collision, the following constraints are inevitable.

First is a cost/weight competitiveness reduction problem. This is because the smaller the collision space or the greater the vehicle weight, the cost/weight are increased in proportion with the above, such that the reinforcement level of a side sill and for protecting a battery cell from the side collision applies a relatively large number of extruded materials or reinforcement materials as compared with an internal combustion engine, thereby increasing the cost/weight.

Second is a side sill space constraint problem. This is because the position limitation of the side cell determined by the regulated full width of the battery cell and the specification of the vehicle allow for a very small amount of deformation (for example, about 45 mm) as compared with the internal combustion engine vehicle, such that the side sill spaces of the EV and the MHEV may reach a level where it is impossible to additionally apply the extruded material or the reinforcement material proportional to the increment in the vehicle weight.

Third is a design limitation problem of the EV and the MHEV. This is because the specification of the vehicle is changed relative to the design to necessarily increase the collision space of the side sill in order to satisfy the High Voltage Safety Regulation (FMVSS 301) in which the side sill pushed in upon the side collision is required not to hit the battery pack.

Fourth, deformation of the side sill due to the side collision may sufficiently prevent damage to the battery pack even without expanding the collision space of the side sill for additionally applying the extruded material or the reinforcement material.

Embodiments of the present disclosure can prevent damage to the battery pack due to the contact between the side sill and the battery pack while the space between the side sill and the battery pack positioned under the center floor lower panel is narrowed in the vehicle width direction upon the side collision. To this end, a plastic hinge bracket is applied to the battery pack mounting module to induce a certain trajectory in a direction in which the battery pack may avoid the collision due to the side collision.

The plastic hinge bracket is a bracket in which a member, which is rotated like a hinge by an operation of the bending moment due to the load, has been formed, upon plastic deformation.

An embodiment of the present disclosure provides a battery pack mounting module, which may apply a plastic hinge bracket to support both sides of the battery pack positioned under the center floor to move the battery pack downward while forming a rebound avoidance behavior trajectory upon the side collision.

The 'rebound' used to describe embodiments of the present disclosure means the behavior by the plastic hinge at the other side of the plastic hinge bracket while the force caused by the side collision of the vehicle operates at one side thereof, the 'avoidance' means not to allow it to hit or contact the side sill pushed and intruded by the external impact, the 'behavior' means that the movement of the battery pack due to the plastic hinge deformation is a kind of 'plastic behavior,' and the 'plastic hinge deformation' means the plastic deformation of the 'plastic hinge.'

A battery pack mounting module according to embodiments of the present disclosure includes a plastic hinge bracket which secures a mounting space where a battery pack is positioned by a mounting arm at a side sill side, and induces the battery pack downward movement and the battery pack lateral movement by the plastic hinge deformation of a plastic hinge A and a plastic hinge B of the mounting arm upon intrusion of the side sill pushed toward the battery pack to form a rebound avoidance behavior trajectory which avoids the contact between the battery pack and the side sill.

As a preferred embodiment, the plastic hinge bracket forms the plastic hinge deformation in a state fixed to the sites of the battery pack and the side sill, respectively, and the plastic hinge deformation forms a rotation motion which forms the battery pack downward movement and the battery pack lateral movement.

As a preferred embodiment, the rotation motion of the plastic hinge bracket rotates the side sill side around the plastic hinge A and rotates the battery pack side around the plastic hinge B, and the plastic hinge A operates as the center of the rotation motion of the battery pack.

As a preferred embodiment, the rebound avoidance behavior trajectory applies, as design parameters, a battery pack height (H), a battery pack lateral movement distance (L), a battery pack downward movement distance (R), a plastic hinge avoidance behavior length (C), and a battery pack rotation allowable angle (θ), and the battery pack lateral movement distance (L) and the battery pack downward movement distance (R) at which the battery pack may perform the avoidance behavior from the side sill are calculated by applying $$C\cos\theta + C\sin\theta\tan\frac{\theta}{2} > H,$$

respectively, and the plastic hinge avoidance behavior length (C) among the design parameters is classified into a side sill spacing length (C1), which is connected from the plastic hinge A to the side sill, and a mounting arm length (C2) which is connected from the plastic hinge A to the plastic hinge B, and the battery pack lateral movement distance (L), the battery pack downward movement distance (R), the side sill separation distance (C1), and the mounting arm length (C2) at which the battery pack may perform the avoidance behavior from the side sill are calculated as design application variables by applying $$C_1 + C_2\left(\cos\theta + \sin\theta\tan\frac{\theta}{2}\right) > H.$$

As a preferred embodiment, the plastic hinge bracket forms an upward sloped angle at the mounting arm, and the upward sloped angle forms an acute angle with respect to the ground from the plastic hinge B toward the plastic hinge A.

As a preferred embodiment, the plastic hinge bracket includes a seating flange, a fixing flange, an insertion channel, and a pin hole connected from the mounting arm, the seating flange forms a fixing force for the side sill, and the fixing flange forms a fixing force for a battery pack panel for supporting the battery pack at the lower portion.

As a preferred embodiment, the plastic hinge A is positioned between the seating flange and the mounting arm, the plastic hinge A is positioned at the outermost surface in the vehicle width direction extending from the seating flange, and when a collision occurs on the side surface of the vehicle, the battery pack performs the downward movement (R) by the deformation of the plastic hinge A and the plastic hinge B of the mounting arm, thereby inducing the avoidance behavior trajectory by the rotation motion of the mounting arm so as to avoid the collision between the battery pack and the side sill.

As a preferred embodiment, there is a bent arm bent from the seating flange in the ground direction of the vehicle to form a certain length, the plastic hinge A is positioned between the bent arm and the mounting arm, the plastic hinge A is positioned at the outermost surface in the vehicle width direction extending from the seating flange, and when the collision occurs on the side surface of the vehicle, the battery pack performs the downward movement (R) by the deformation of the plastic hinge A and the plastic hinge B of the mounting arm while the side sill performs the lateral movement (L) in the vehicle width direction, thereby inducing the avoidance behavior trajectory by the rotation motion of the mounting arm so as to avoid the collision between the battery pack and the side sill.

The battery pack mounting module applied to the vehicle according to embodiments of the present disclosure implements the following operations and effects by using the method of moving downward and spacing the battery pack to absorb/disperse the collision energy when the vehicle is subjected to the side collision.

First, it is possible to avoid the battery pack from the intrusion of the side sill with respect to the battery pack in the eco-friendly vehicle, particularly, the EV and the MHEV, thereby further reducing the existing widthwise space between the battery pack and the side sill to increase the size of the battery cell.

Second, it is possible to apply the plastic hinge mounting bracket so that the battery pack may avoid the widthwise collision between the side sill and the center floor lower panel with the rebound avoidance behavior trajectory from the side collision, thereby reducing the space even in the vertical direction to increase the size of the battery cell.

Third, it is possible to easily satisfy the High Voltage Safety Regulation (FMVSS 301) according to the side collision in the EV and the MHEV, which is not easy to secure the side sill space as compared with the internal combustion engine vehicle.

Fourth, it is possible to remove the extruded material and/or the reinforcement material proportional to the increment in the narrow collision space and the vehicle weight from the side sill, thereby eliminating the design limitations on the specification of the vehicle.

Fifth, it is possible to apply the rebound avoidance behavior trajectory method by the plastic hinge mounting structure, thereby eliminating the position limitation of the side sill determined by the regulated full width of the battery cell and the specification of the vehicle.

Sixth, it is possible to apply the optimization of the geometrical mechanism for the rebound avoidance trajectory to the plastic hinge mounting structure of the battery pack with the Design Geometrical Relation, thereby facilitating the modularization of the battery pack for the battery mounting under center floor structure.

DETAILED DESCRIPTION OF ILLUSTRATIVE EMBODIMENTS

Hereinafter, embodiments of the present disclosure will be described in detail with reference to the accompanying exemplary drawings, and since the embodiments may be implemented in various different forms as an example by those skilled in the art to which the present disclosure pertains, these are not limited to the embodiments described herein.

Figure 1:
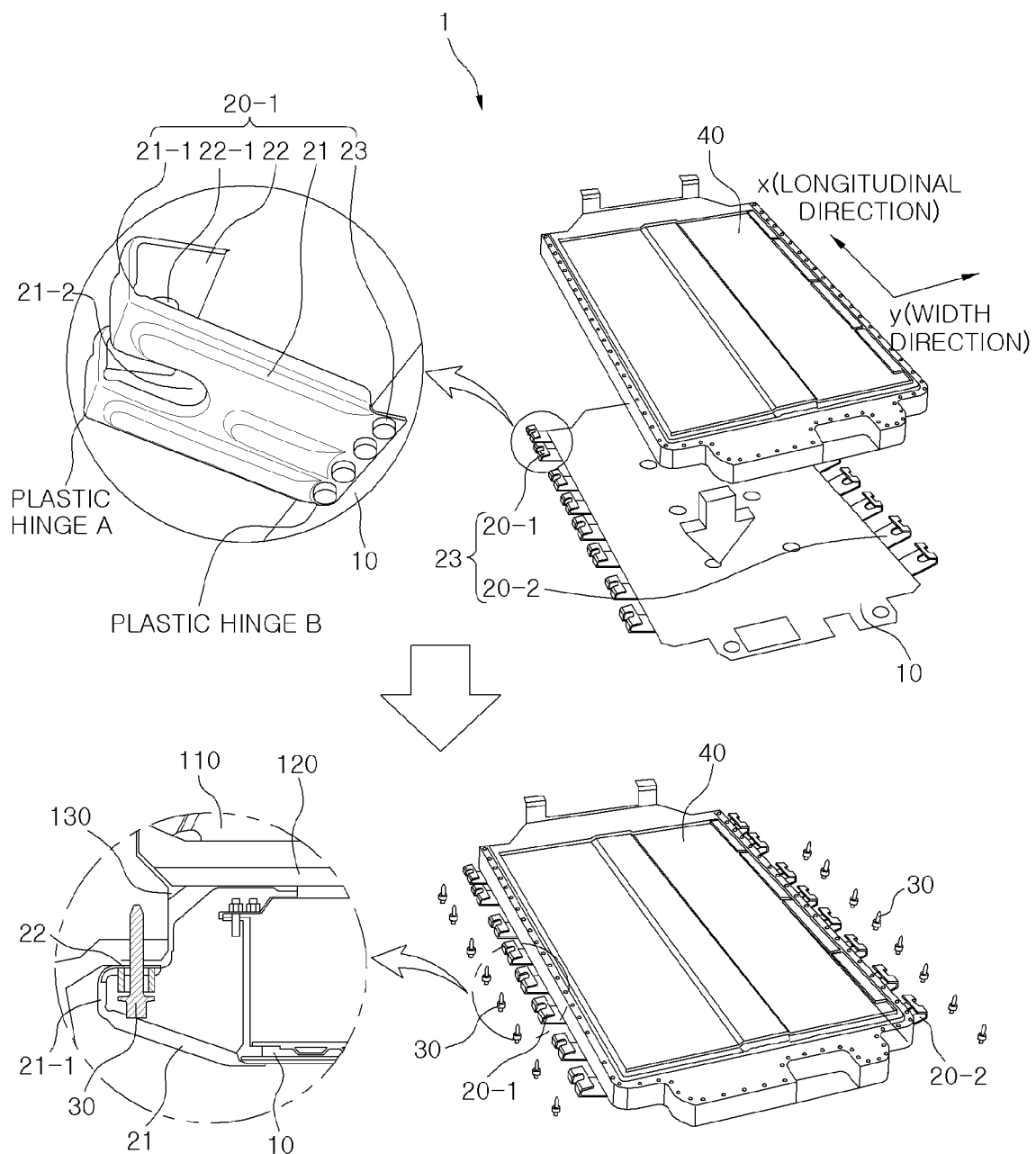
FIG. 1 is an exploded configuration diagram of a downward movement spacing type battery pack mounting module according to embodiments of the present disclosure.

Referring to FIG. 1, a battery pack mounting module 1 is positioned under a center floor panel 120 of a vehicle body frame 110.

Figure 2:
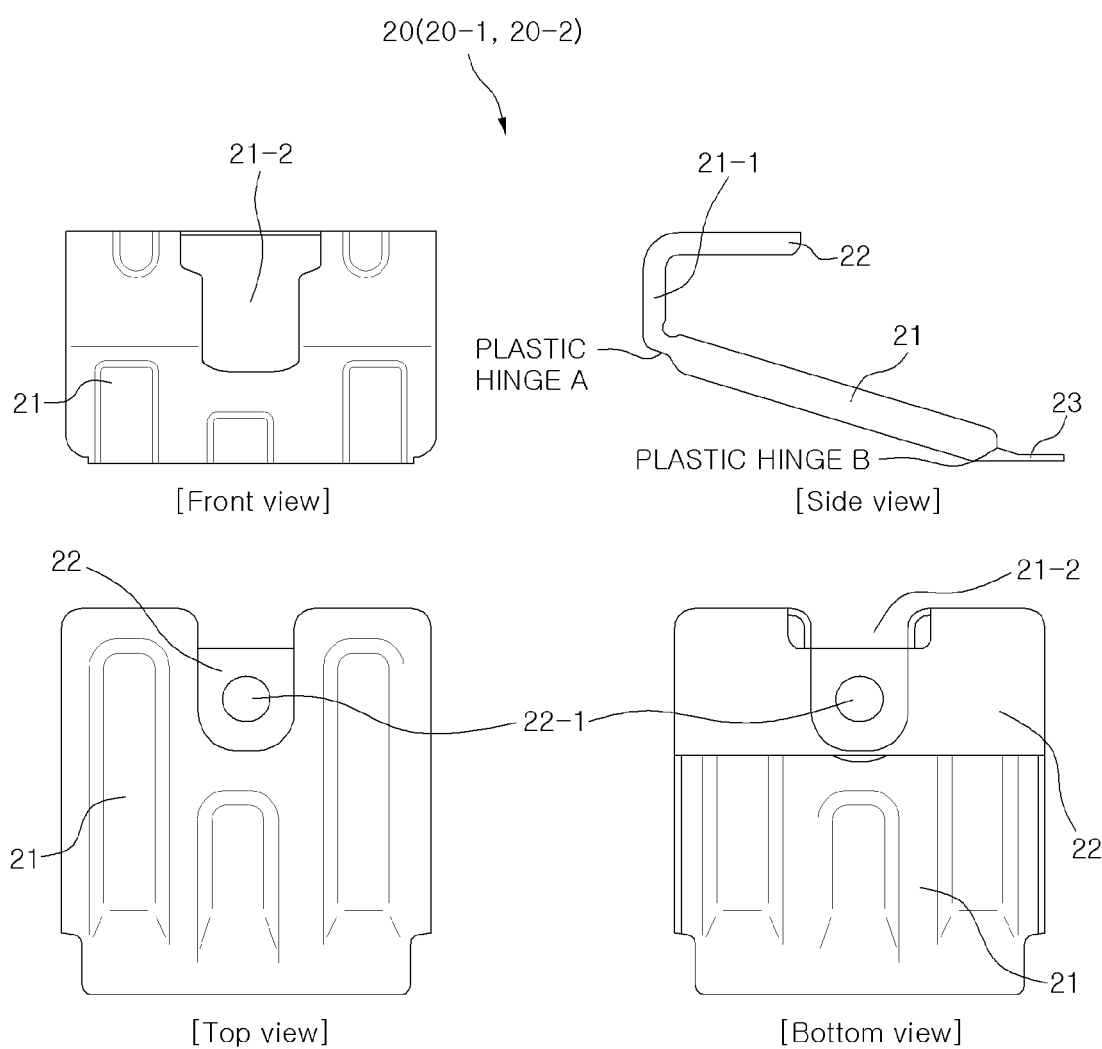
FIG. 2 is a diagram showing a plastic hinge bracket constituting a battery pack mounting module according to embodiments of the present disclosure to generate a rebound avoidance behavior trajectory.

Referring to FIG. 2, the battery pack mounting module 1 includes a battery pack panel 10, a plastic hinge bracket 20, and a fixing member 30. The battery pack mounting module 1 is positioned under the center floor panel 120, and is a structure which is supported by a side sill 130.

Specifically, the battery pack panel 10 is made of a plate material of a rectangular shape having a predetermined thickness or various shapes to support a battery pack 40 from the lower portion. If both sides of the battery pack panel 10 may be fastened to the side sill 130 by the plastic hinge bracket 20, there is no limitation in shape. Hereinafter, it will be described based on a rectangular panel.

Plastic hinge brackets 20, 20-1, 20-2 include a seating flange 22, a bent arm 21-1 bent from the seating flange to extend toward the ground, a mounting arm 21 bent from the bent arm again to extend toward the battery pack panel 10, and a fixing flange 23 bent from the mounting arm to support both side lower portions of the battery pack panel 10. Regarding the positions of a plastic hinge A and a plastic hinge B, the plastic hinge A is positioned between the bent arm 21-1 and the mounting arm 21, and the plastic hinge B is positioned between the mounting arm 21 and the fixing flange 23.

The mounting arm 21 is bent from the seating flange 22 to be connected, and forms an insertion channel 21-2 to be used as a space into which the fixing member 30 is inserted. Further, referring to the Top/Bottom Views of FIG. 2, the seating flange 22 perforates a pin hole 22-1 so that the fixing member 30 passes through and is fastened to the side sill 130.

The seating flange 22 of the plastic hinge bracket is fixed to the side sill 130 by the fixing member 30, and more specifically, the fixing member 30 is fixed to the side sill 130 by penetrating the pin hole 22-1 through the insertion channel 21-2 of the plastic hinge bracket.

The fixing flange 23 of the plastic hinge bracket is fixed to the battery pack along both side lower edges of the battery pack panel 10.

The vertical length of the bent arm 21-1 corresponds to a distance at which the battery pack may move downward from the center floor panel toward the ground, and a case of being directly bent from the seating flange to the mounting arm 21 without the bent arm 21-1 is also possible. However, in this case, the position of the battery pack panel 10 rises by the length of the bent arm 21-1. A case where there is no bent arm 21-1 at the plastic hinge bracket is directly bent from the seating flange to the mounting arm 21, and the position of the plastic hinge A is positioned on the extension line of the seating flange.

A weld-bonded site between the left and right plastic hinge brackets 20-1, 20-2 and the battery pack panel 10 is the fixing flange 23, and the plastic hinge B is positioned on the edge portion of the battery pack connected with the fixing flange. That is, the plastic hinge B formed on the plastic hinge bracket 20 is positioned at both side lower edge portions of the battery pack panel 10 on which the battery pack 40 has been placed.

In order to support and fix both left and right sides of the battery pack panel 10 to the plastic hinge brackets 20, 20-1, 20-2, a welding coupling (spot welding) is also possible.

The battery pack 40 is composed of a cell unit which bundles a plurality of battery cells to be positioned under the center floor panel 120 of the vehicle body frame no. Therefore, multiple plastic hinge brackets are used for the battery pack mounting module 1 along the center floor panel.

Specifically, the plastic hinge bracket 20 may be fixed to the fixing member 30 fastened by a side sill extruded material 130-1 (see FIG. 5) through the side sill in a state where the battery pack panel 10 and one side portion thereof have been connected, and the side sill extruded material 130-1 may be omitted for weight reduction.

The plastic hinge A and the plastic hinge B are positioned at both sides of the mounting arm 21 so that the distance between the battery pack and the side sill is subject to the plastic deformation while being reduced upon the intrusion of the side sill due to the side collision. Further, if the plastic deformation occurs, the weight of the battery pack may additionally affect the plastic deformation of the plastic hinge A and the plastic hinge B as well.

Meanwhile, the plastic hinge bracket 20 is formed of a pair of the left plastic hinge bracket 20-1 and the right plastic hinge bracket 20-2. In this case, each of the left and right plastic hinge brackets 20-1, 20-2 is formed in plural so as to be disposed at a certain interval along the battery pack panel 10 positioned along the front and rear directions of the vehicle, and the number thereof is determined according to the size of the battery pack panel 10.

In particular, the left plastic hinge bracket 20-1 is weld-bonded (for example, spot welding) with the battery pack panel 10 at the left side surface of the battery pack panel 10 and simultaneously fixed to the left side sill 130 via the fixing member 30, and the right plastic hinge bracket 20-2 is welding-bonded (for example, spot welding) with the battery pack panel 10 at the right side surface of the battery pack panel 10 and simultaneously fixed to the left side sill 130 via the fixing member 30.

Figure 3:
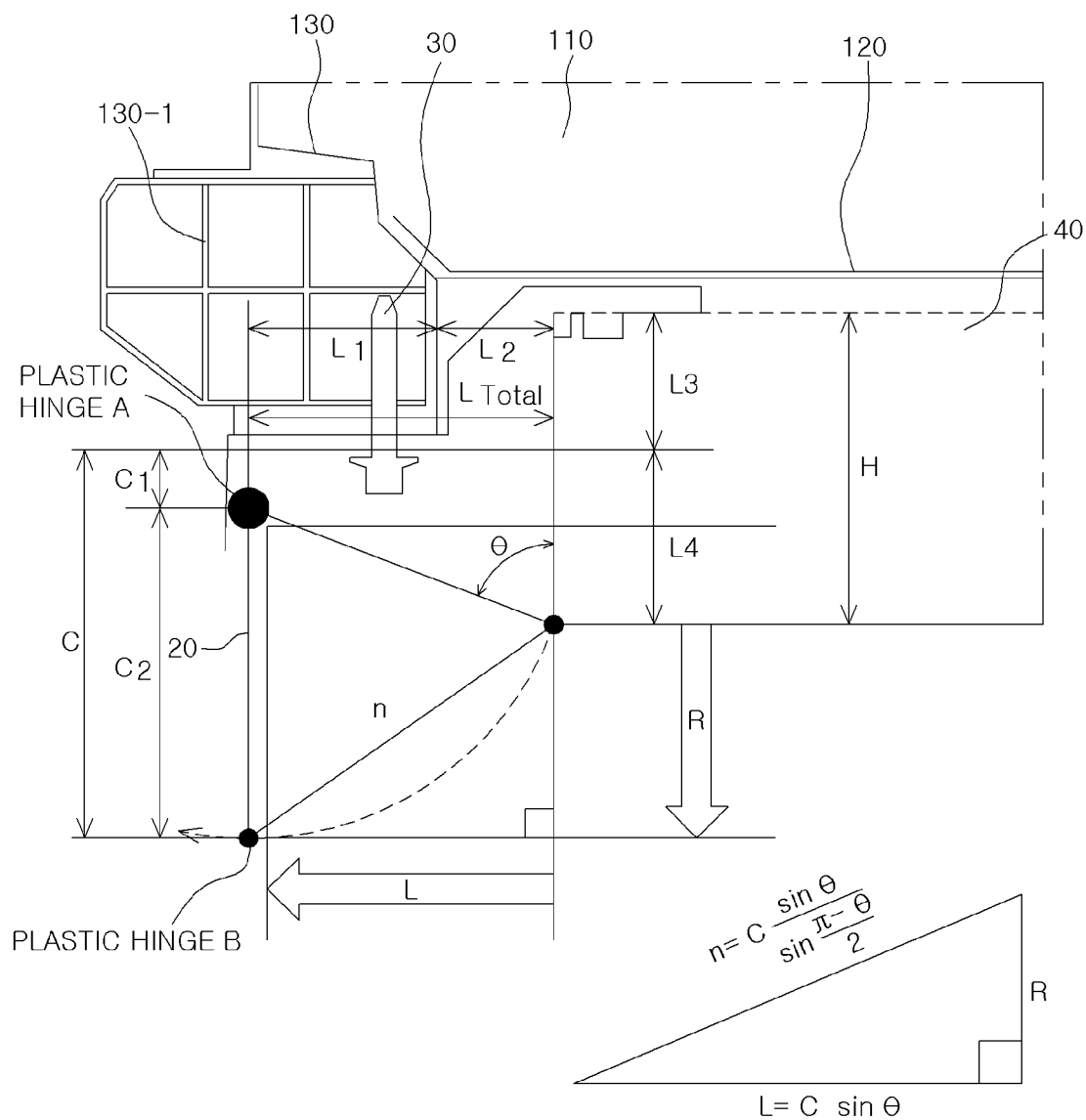
FIG. 3 is a diagram showing a design parameter of the battery pack mounting module for optimizing the rebound avoidance behavior trajectory of the plastic hinge bracket applied to the battery pack mounting module according to embodiments of the present disclosure.

The battery pack is capable of a rebound avoidance behavior trajectory (see FIG. 5) from the side collision by the plastic hinge A and the plastic hinge B, and the battery pack 40 may be separated or detached from the battery pack mounting module, and moved downward (that is, the battery pack downward movement distance (R) in FIG. 3) by avoiding the side sill intruded by the side collision.

That is, the battery pack 40 may avoid the intrusion of the side sill 130 (see FIG. 5) upon the external side collision through the operation of the plastic hinges A, B, thereby being prevented from being completely detached from the vehicle body frame 110, more specifically, the center floor panel. In particular, the rebound avoidance behavior trajectory is that the mounting arm portion, which is the straight length section of the plastic hinges A, B, has a higher plastic hinge A than the plastic hinge B between the side sill and the battery pack, and the mounting arm 21 is disposed to be sloped in a diagonal line to form the height difference, thereby increasing the space utilization between the side sill and the battery pack.

Each of the left and right plastic hinge brackets 20-1, 20-2 may be subject to the plastic hinge deformation with respect to the external side collision load delivered to the battery pack 40 in a state of supporting the battery pack panel 10 on which the battery pack 40 has been mounted and then may make the rebound avoidance behavior trajectory, thereby forming the maximum downward movement amount which may prevent the battery pack 40 from being completely detached from the mounted position.

Therefore, the battery pack mounting module 1 is the battery mounting under center floor structure, but is characterized as the downward movement spacing type battery pack mounting module which easily satisfies the High Voltage Safety Regulation (FMVSS 301) even while reducing the size of the side sill 130 (see FIG. 6) by about 50% relative to the existing one so that the number of cells of the battery pack 40 required for increasing the vehicle range may be increased.

FIG. 2 shows an example of the shape and structure of each of the left and right plastic hinge brackets 20-1, 20-2. In this case, since each of the left and right plastic hinge brackets 20-1, 20-2 has the same shape and structure, the plastic hinge bracket 20 is described, and since description of the shape and the structure is one embodiment of various embodiments, it is not limited thereto.

The plastic hinge bracket 20 may strengthen the rigidity of the mounting arm 21 by forming a rib, and strengthen the rigidity of the mounting arm 21 and the seating flange 22 by forming a rim flange.

The fixed flange 23 is formed on the extension line of the plastic hinge B, and the straight length section of the plastic hinge A and the plastic hinge B is sloped to form the rebound avoidance behavior trajectory with the height difference of the plastic hinge A relative to the plastic hinge B. In this case, the sloped angle of the mounting arm 21 is determined by an optimization derivation design method of the rebound avoidance behavior trajectory (see FIGS. 3 to 5).

Furthermore, the seating flange 22 forms a close contact surface to strengthen the fixing force of the plastic hinge bracket 20 by the fixing member 30. Further, the fixing flange 23 is formed in the size of forming a welding position in a plurality of sites in a state of having closely contacted the battery pack panel 10.

Figure 4:
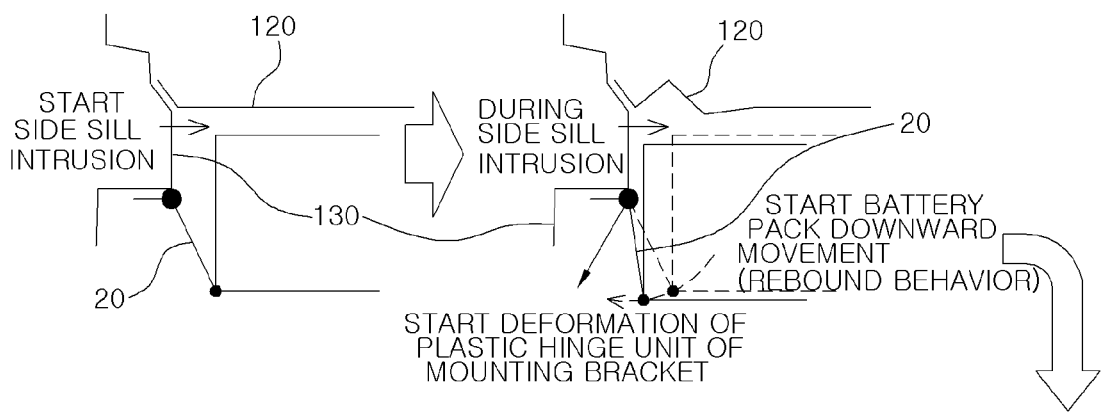
FIG. 4 is a diagram showing an example of a mounting position of the plastic hinge bracket where the lateral/downward movement amount of the battery pack necessary for the avoidance behavior according to embodiments of the present disclosure is maximized.
Figure 4:
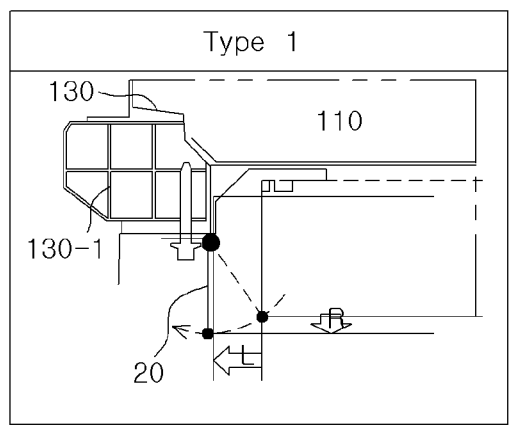
Figure 4:
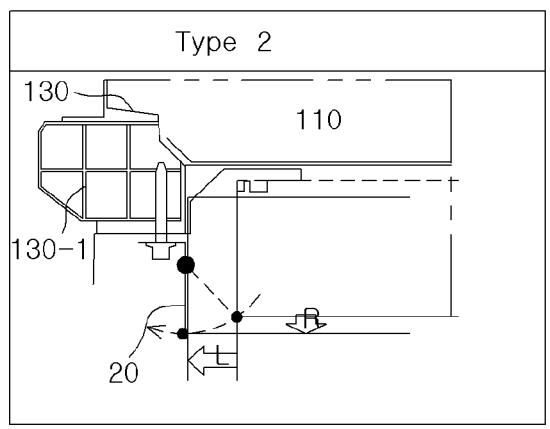
Figure 4:
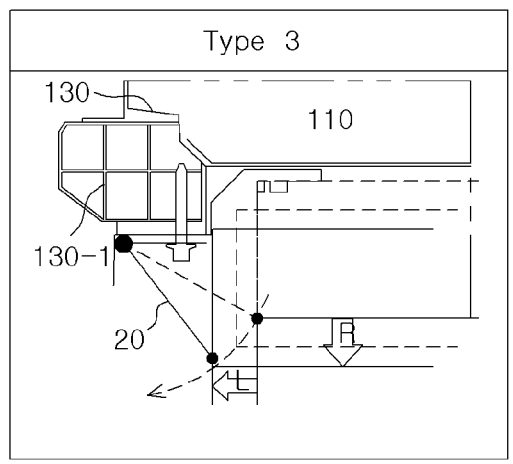
Figure 4:
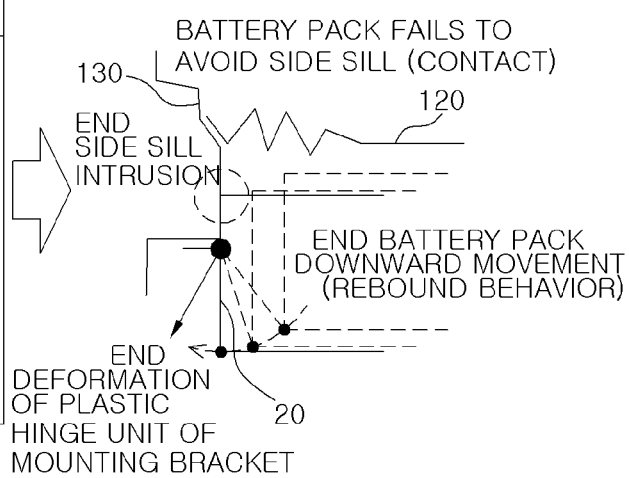
Figure 5:
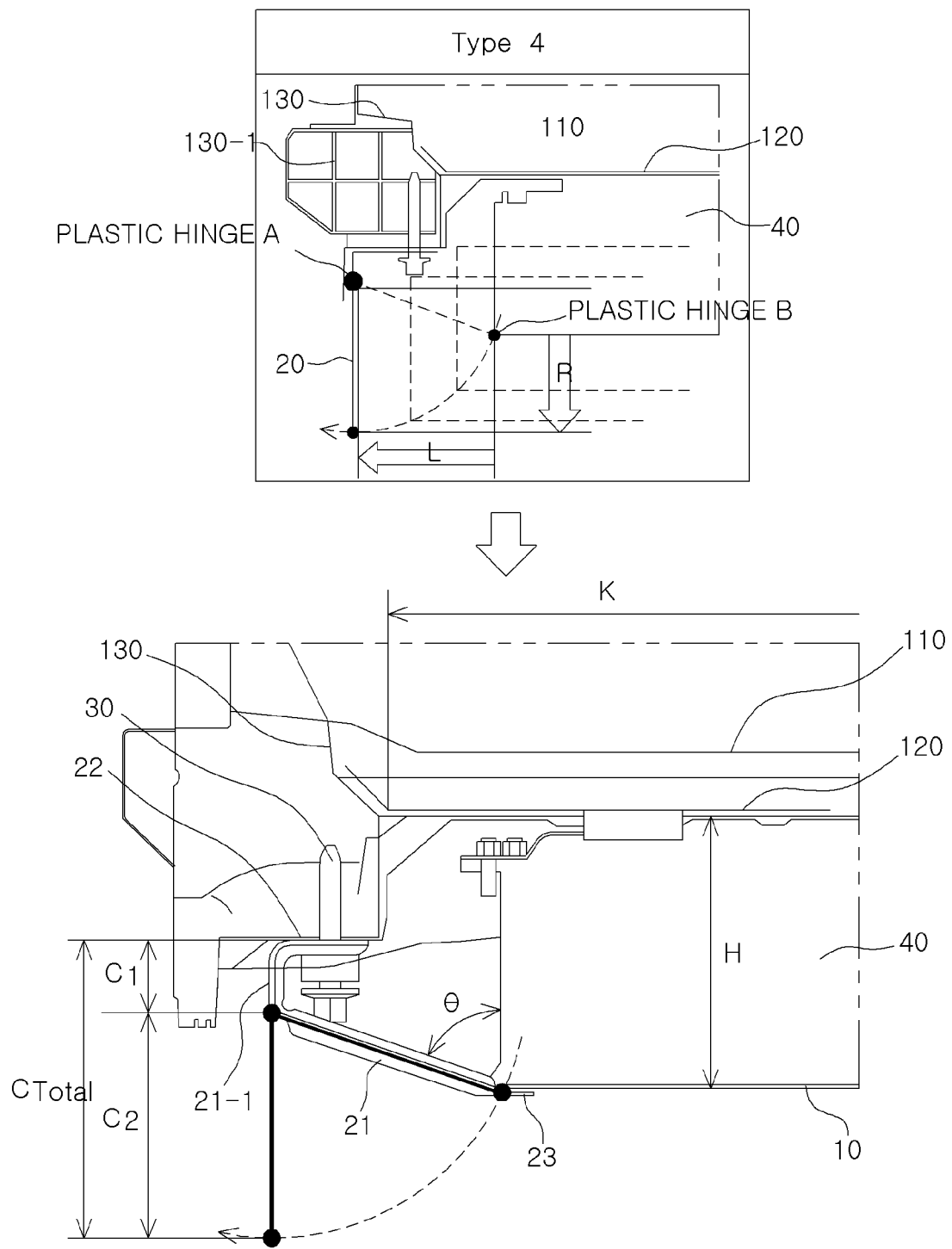
FIG. 5 is a diagram showing an example of designing a downward movement spacing type battery pack mounting module by determining the mounting position of the plastic hinge bracket where the lateral/downward movement amount of the battery pack necessary for the avoidance behavior according to embodiments of the present disclosure is maximized.

Meanwhile, FIGS. 3 to 5 show a process for selecting and deriving design parameters applied to the battery pack mounting module 1 in order to optimally derive the rebound avoidance behavior trajectory of the plastic hinge bracket 20. In this case, the optimization of the rebound avoidance behavior trajectory means the plastic hinge deformation of the plastic hinge bracket 20 in which the battery pack 40 may be moved downward without being completely separated from the center floor panel 120.

Referring to FIG. 3, the design parameters set, as basic factors, a battery pack height (H), a battery pack lateral movement distance (L), a battery pack downward movement distance (R), a plastic hinge avoidance behavior length (C), and a battery pack rotation allowable angle ($\theta$), which are associated with the plastic hinge bracket 20, the battery pack 40, and the side sill 130. At this time, the battery pack lateral movement distance (L) means a relative distance with the battery pack when the side sill is intruded.

Subsequently, the rebound avoidance behavior trajectory optimization derivation process through the design parameters is as follows. In this case, it is assumed that the plastic hinge bracket 20 is a structure of connecting the lower edge portion of the side sill 130 with the lower edge portion of the battery pack 40.

First, the battery pack lateral movement distance (L), the plastic hinge bracket rotation angle ($\theta$), and a side sill overlap height (A) according to the side sill intrusion amount (side sill movement distance ($L_{Total}$)) upon the side collision are obtained by using a geometric relationship formula for the battery mounting under center floor structure on which the battery pack mounting module 1 is mounted as follows.

$$H = A + B \qquad \text{Equation 1:}$$

$$L = C \sin\theta \qquad \text{Equation 2}$$

$$B = C \cos\theta (0 < \theta \pi/2) \qquad \text{Equation 3}$$

where the A represents the vertical overlap amount by the vertical step difference of the upper end of the battery pack and the lower end of the side sill as the side sill overlap height.

The L3 refers to the distance from the upper end of the battery pack to the lower end of the side sill, which corresponds to the overlap height if the side sill is intruded as it is.

The L4 refers to the distance from the lower end of the side sill to the lower end of the battery pack, which is represented as the side sill non-overlap height.

The C refers to the plastic hinge avoidance behavior distance, and the sum of the length (C2) of the mounting arm 21 of the plastic hinge bracket 20 and the length ($C_1$) of the bent part extending from the seating flange 22 fixed to the lower portion of the side sill. The $C_1$ refers to the distance from the seating flange fixed to the lower portion of the side sill to the plastic hinge A and also refers to the length of the bent arm.

The H represents that the height of the battery pack is the sum of L3 and L4, and the L represents the intrusion amount of the side sill as the battery pack lateral movement distance due to the gap between the battery pack 40 and the side sill 130 during the side collision. At this time, the position of the lower end of the side sill and the position of the seating flange may be substantially the same except for a difference of the fastened thickness.

Subsequently, the maximum downward movement amount of the battery pack 40 is calculated by the following relationship formula by using the triangle in FIG. 3.

$$R = \sqrt{\left(C\dfrac{\sin\theta}{\sin\dfrac{\pi-\theta}{2}}\right)^2 - (C\sin\theta)^2} = C\sin\theta\sqrt{\dfrac{1}{(\cos\theta/2)^2} - 1} \qquad \text{Equation 4}$$

$$R = C\sin\theta\tan\dfrac{\theta}{2} \quad (0 < \theta < \pi/2) \qquad \text{Equation 5}$$

where the R represents the maximum downward movement amount (or rebound amount) of the battery pack 40 as the downward movement length of the battery pack, and the angle θ represents the rotatable angle of the battery pack 40 by the diagonal mounting arm length by some sections of the mounting arm 21 and the seating flange 22 of the plastic hinge bracket 20 as the rotation allowable angle of the battery pack and the rotatable angle of the diagonal mounting arm~the battery pack.

Further, the condition for avoiding the intrusion of the side sill 130 by moving the battery pack 40 laterally and downward is calculated by the following relationship formula.

$$B+R>H \qquad \text{Equation 6}$$

Subsequently, the following relationship formula is calculated by substituting and summarizing the Equations 3 and 5 into the Equation 6.

$$C\cos\theta + C\sin\theta\tan\dfrac{\theta}{2} > H \qquad \text{Equation 7}$$

As a result, the Equation 7 represents that the rotation allowable angle (θ) and the plastic hinge avoidance behavior length (C) of battery pack should be properly matched (or set) in order for the battery pack 40 to avoid the side sill 130, and therefore, in order for the battery pack 40 to be completely detached from the side sill 130 and perform the avoidance behavior, the battery pack lateral movement distance (L) and the battery pack downward movement distance (R) should be sufficiently secured at the same time.

Therefore, the mounting position of the plastic hinge bracket 20 which maximizes the lateral/downward movement amount (R) of the battery pack 40 required for the avoidance behavior is calculated by the following relationship formula.

$$L_{Total}=L_1+L_2 \qquad \text{Equation 8}$$

$$C_{Total}=C_1+C_2 \qquad \text{Equation 9}$$

where the $L_{Total}$ refers to the battery pack lateral movement distance and the sum of $L_1$ and $L_2$. The $L_1$ refers to the distance from the outside of the vehicle body frame to the point where the side sill 130 is protruded into the vehicle to face the side surface of the center floor panel. That is, The $L_1$ refers to the side sill occupancy length occupied from the outside of the vehicle body frame into the vehicle.

The $L_2$ refers to the distance that the side sill intrudes into the vehicle by a pre-designed $L_1$ or more when a collision occurs on the side surface of the vehicle from the outside. Therefore, the $L_{Total}$ refers to the relative distance at which the battery pack may move laterally, the $L_1$ refers to the length determined in the vehicle body frame design, and the $L_2$ refers to the intrusion distance of the side sill pushed only upon the side collision, and at the same time, the relative movement distance of the battery pack.

The $C_{Total}$ refers to the sum of the length ($C_1$) of the bent arm and the length ($C_2$) of the mounting arm of the plastic hinge bracket.

The $C_1$ refers to the distance from the plastic hinge A of the mounting arm 21 of the plastic hinge bracket 20 to the bent seating flange 22 and the separation distance from the lower portion of the side sill.

The $C_2$ represents the height from the plastic hinge A to the plastic hinge B of the mounting arm 21 as the length of the mounting arm.

As a result, the following relationship formulas are calculated by substituting and summarizing the Equations 8 and 9 into the Equations 2 and 5.

$$L_{Total} = L_1 + L_2 = (C_1 + C_2)\sin\theta \qquad \text{Equation 10}$$

$$R = \sqrt{\left(C_2\dfrac{\sin\theta}{\sin\dfrac{\pi-\theta}{2}}\right)^2 - (C_2\sin\theta)^2} = C_2\sin\theta\tan\dfrac{\theta}{2} \qquad \text{Equation 11}$$

Subsequently, the following relationship formulas are calculated by substituting and summarizing the Equation 11 into the Equation 6.

$$B + R > H \qquad \text{Equation 12}$$

$$B = C_2\cos\theta + C_1 \qquad \text{Equation 13}$$

$$(C_2\cos\theta + C_1) + C_2\sin\theta\tan\dfrac{\theta}{2} > H \qquad \text{Equation 14}$$

$$C_1 + C_2\left(\cos\theta + \sin\theta\tan\dfrac{\theta}{2}\right) > H \qquad \text{Equation 15}$$

As a result, from the Equation 15, the $C_1$, $C_2$, θ, H among the geometry of a detachable structure in which the battery pack 40 avoids from the intrusion of the side sill 130 are derived as four design application variables.

Referring to FIG. 4, shown is the influence of the mounting position change in the vehicle body frame 110 of the plastic hinge bracket 20, more specifically, the center floor panel on the lateral/downward movement amounts of the battery pack due to a change in the dimensions of the $C_1$, $C_2$, θ, H applied to the rebound detachable behavior structure of the battery pack 40.

As shown, the side sill 130 is pushed into the vehicle due to the side collision to deliver the collision amount to the center floor panel 120. Then, the battery pack 40 starts the downward movement (that is, rebound behavior) from the intrusion of the side sill 130, thereby starting the plastic hinge deformation through the plastic hinges A, B in the plastic hinge bracket 20.

In this case, the plastic hinge deformation is a rotational motion which forms the battery pack downward movement (R) and the battery pack lateral movement (L), and each motion rotates the side sill side around the plastic hinge A and rotates the battery pack side around the plastic hinge B, such that the plastic hinge A operates as the center of the rotational motion.

For example, the battery pack downward movement distances (R) and the battery pack lateral movement distances (L) in Types 1, 2, 3, 4 have the following differences.

Battery pack downward movement distance (R)=rebound amount : Type 4>Type 3>Type2>Type 1

Battery pack lateral movement distance (L) : Type 4>Type 1=Type 2=Type 3

In this case, each of the Type 1, Type 2, and Type 3 shows a case where it is difficult for the battery pack 40 to avoid the side sill by the battery pack 40 contacting the pushed side sill 130 after ending the deformation of the plastic hinges A, B while ending the battery pack downward movement (that is, rebound behavior) when ending the intrusion of the side sill 130.

The Types 1, 2, 3, 4 are described by classifying the position of the plastic hinge A in the plastic hinge bracket into the vehicle width direction (laterally) and the vehicle vertical direction (downward).

First, the Type 1 shows that there is no bent arm 21-1 of the plastic hinge bracket, and the position of the plastic hinge A which is the starting point of the mounting arm 21 is positioned on the extension line of the inside cross section of the side sill corresponding to the innermost surface from the seating flange 22 in the vehicle width direction, and is the point where the lateral distance between the plastic hinge A and the battery hinge B is the closest. Further, since it is positioned on the extension line of the seating flange 22, it is the same as the position of the seating flange in the ground direction (downward).

The Type 2 shows that there is the bent arm 21-1 of the plastic hinge bracket, and the position of the plastic hinge A which is the starting point of the mounting arm is the closest point to the battery pack among the inside cross section of the side sill corresponding to the innermost surface from the seating flange 22 in the vehicle width direction. However, since it is positioned between the bent arm bent from the seating flange 22 and the mounting arm, the plastic hinge A is positioned lower by the length of the bent arm 21-1 than the seating flange in the ground direction. Therefore, the downward movement distance (R) is greater than that in the Type 1, and the lateral movement distance is the same as that in the Type 1.

The Type 3 shows that there is no bent arm 21-1 of the plastic hinge bracket, and the position of the plastic hinge A which is the starting point of the mounting arm is the farthest point from the battery pack among the inside cross section of the side sill corresponding to the outermost surface from the seating flange 22 in the vehicle width direction, and is the point where the lateral distance between the plastic hinge A and the battery pack is the farthest. Further, since it is positioned on the extension line of the seating flange 22, it is the same as the position of the seating flange in the ground direction (downward). The length of the mounting arm may be greater than the lengths of the mounting arms in the Types 1 and 2. Therefore, the downward movement distance (R) is greater than those in the Types 1 and 2, and the lateral movement distance is the same as those in the Types 1 and 2.

As in the Type 2, Type 4 shows that there is the bent arm 21-1 of the plastic hinge bracket, and the position of the plastic hinge A which is the starting point of the mounting arm is the farthest point from the battery pack among the inside cross section of the side sill corresponding to the outermost surface from the seating flange 22 in the vehicle width direction. Since the position of the plastic hinge A is positioned between the bent arm bent from the seating flange 22 and the mounting arm, it is positioned lower by the length of the bent arm than the seating flange in the ground direction (downward). The length of the mounting arm is longer than those in the Types 1 and 2 but is smaller than that in the Type 3. However, the height of the battery is lowered by the length of the bent arm, thereby not interfering with the side sill. Therefore, the downward movement distance (R) is greater than those in the Types 1, 2, and 3, and the lateral movement distance is greater than those in the Types 1, 2, and 3 because there is no interference with the side sill.

The Type 4 is a case of maximizing the rebound amount by the battery pack downward movement distance (R) as much as possible by reflecting the characteristic that the greater the values of θ and C are, the greater the R value is, and the Type 4 among the Types 1 to 4 is the most preferable. However, an example of the Type 3 shows a case where there is the lateral interference with the side sill, and if there is no interference with the side sill, the avoidance behavior may be possible by using only the length of the mounting arm without the bent arm as compared with the Type 4.

Referring to FIG. 5, it may be seen that the rebound detachable behavior structure of the battery pack 40 has been applied by meeting the actual vehicle size with the design application variables of $C_1$, $C_2$, θ, H.

Specifically, when the vehicle full width length (K) is 1492 mm based on the side sill inner surface, the H, L, R, $C_1$, $C_2$, θ are applied as follows.

Then, the height (H) of the battery pack may be set to 130 mm, the distance ($C_1$) from the seating flange fixed to the lower portion of the side sill to the plastic hinge A may be set to 38 nm, the length of the mounting arm, that is, the section length ($C_2$) between the plastic hinges A, B may be set to 120 mm, and the battery pack rotation allowable angle (θ) may be set to 72 degrees as the angle of the mounting arm and the battery pack.

Therefore, in the design of the downward movement spacing type battery pack mounting module 1 through the actual vehicle application as described above, if provided are the side sill occupancy length ($L_1$) and the side sill intrusion distance ($L_2$), which are a gap between the side sill 130 and the battery pack 40 as the battery pack lateral movement distance ($L_{total}$) according to the vehicle full width with respect to the height (H) of the battery pack according to the product specifications determined in the planning phase, it may be confirmed whether the battery pack 40 is detached by appropriately adjusting $C_1$, $C_2$, θ which are the design application variables and then substituting them into the Equation 15.

In particular, by deriving the cost/weight correlation formula of the plastic hinge bracket 20 determined by the design application variables to appropriately combine it with the Equation 15, the battery pack mounting module suitable for the battery mounting under center floor structure may further optimize and determine the Geometry Mounting Solution.

Figure 6:
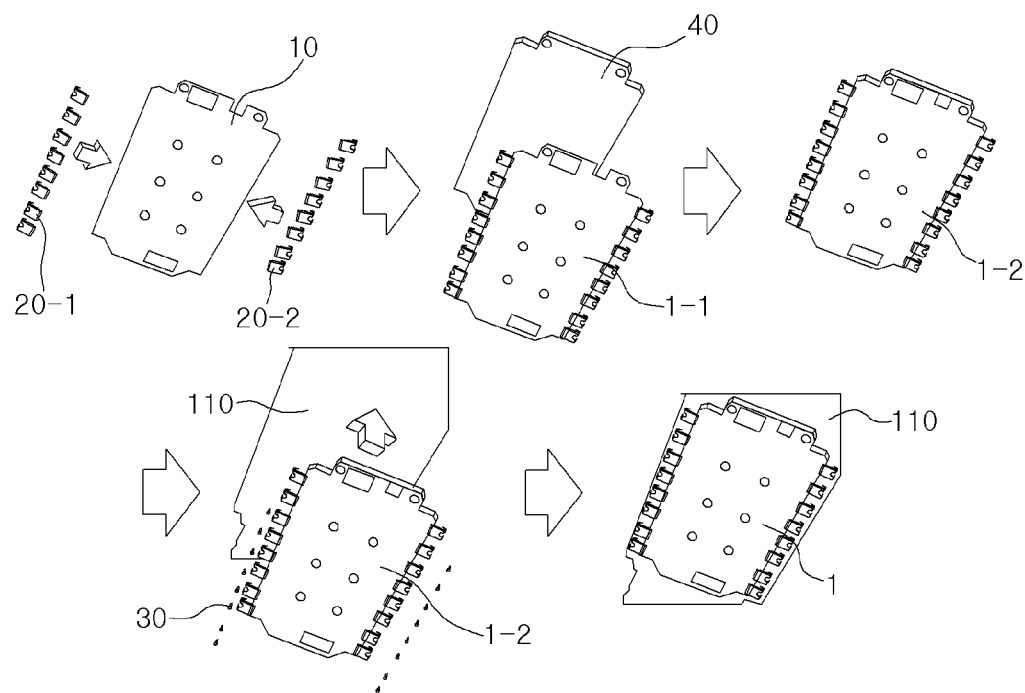
FIG. 6 is a diagram showing an example of a vehicle to which the downward movement spacing type battery pack mounting module according to embodiments of the present disclosure has been applied through an assembling process.
Figure 6:
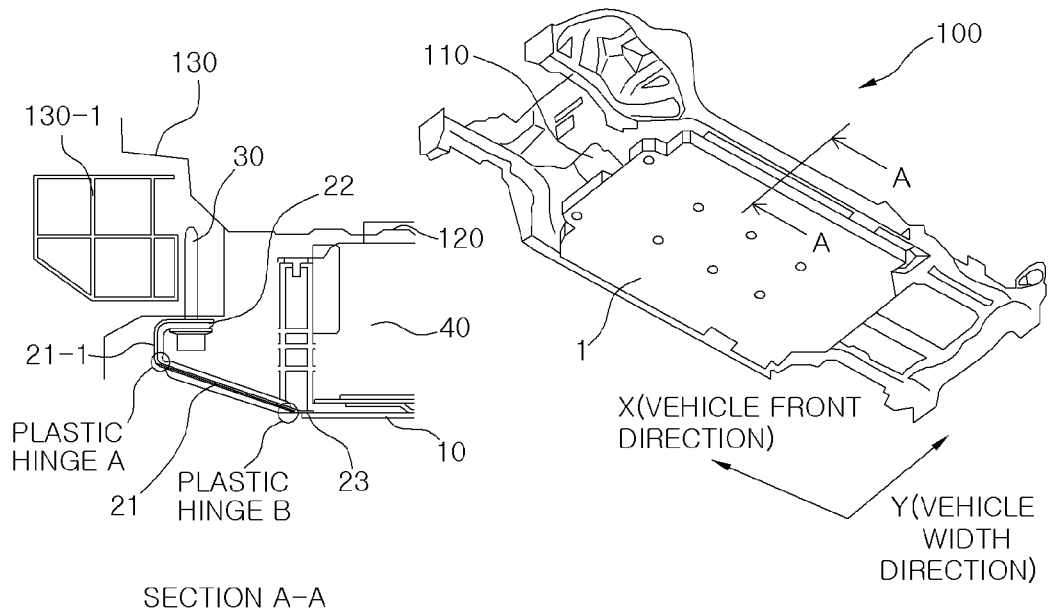
Figure 7:
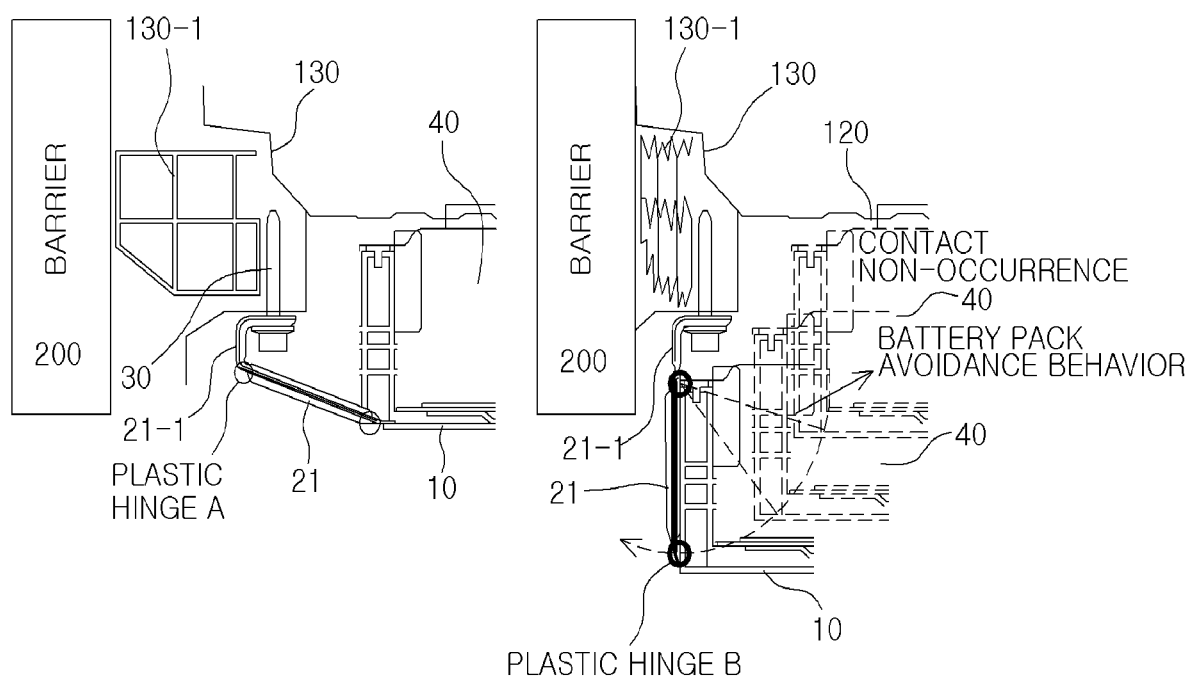
FIG. 7 is a diagram showing a state where the battery pack avoids the widthwise collision point in which the side sill is pushed in a state where the battery pack has not been separated from the plastic hinge bracket by inducing the battery pack avoidance behavior by the rebound avoidance behavior trajectory of the plastic hinge bracket upon the side collision according to embodiments of the present disclosure.
Figure 8:
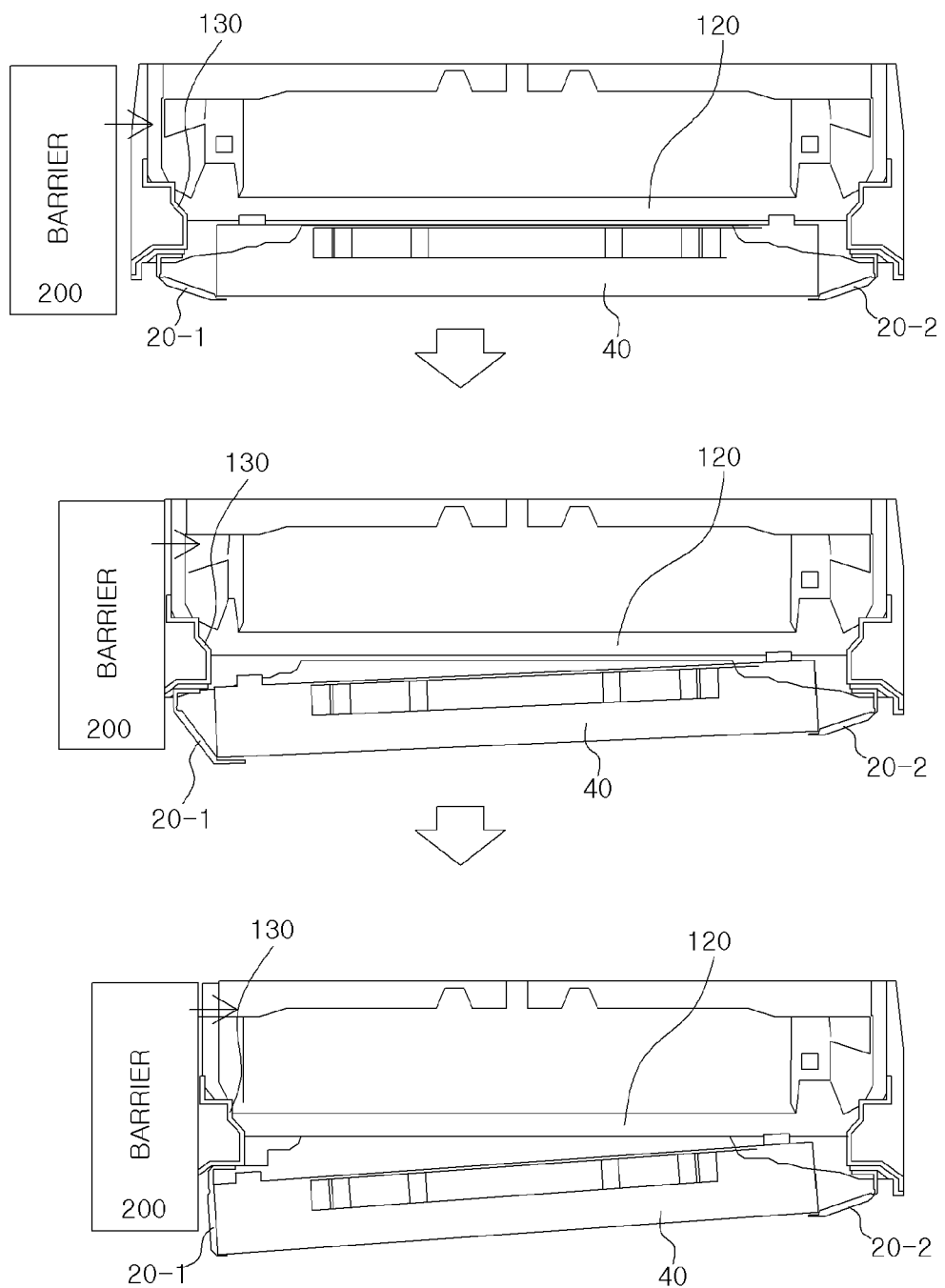
FIG. 8 is a diagram showing a state of having simulated the rebound avoidance behavior trajectory and the battery pack avoidance behavior in FIG. 7 according to embodiments of the present disclosure with the side collision having occurred at the left site of the vehicle.

Meanwhile, FIGS. 6 to 8 show an operation in which the battery pack mounting module 1 designed as the Type 4 in FIG. 5 is applied to the vehicle 100, and the battery pack mounting module 1 safely protects the battery pack 40 in the downward movement spacing method upon the side collision. In this case, the vehicle 100 is an eco-friendly vehicle including EV or MHEV.

Referring to FIG. 6, the battery pack mounting module 1 is mounted to the vehicle 100 through an assembling process. In this case, since the assembling process is only one example, it may be performed in various methods.

First, the battery pack panel 10 and the plastic hinge bracket 20 are coupled to form a panel-bracket assembly 1-1. In this case, since the plastic hinge bracket 20 is composed of the left/right plastic hinge brackets 20-1, 20-2, the right plastic hinge bracket 20-2 is weld-bonded (for example, spot welding) to the right side surface of both left and right side surfaces of the battery pack panel 10 while the left plastic hinge bracket 20-1 is weld-bonded (for example, spot welding) to the left side surface of both left and right side surfaces of the battery pack panel 10.

Subsequently, the battery pack 40 is placed on and coupled to the battery pack panel 10 of the panel-bracket assembly 1-1 to form a panel-bracket-battery assembly 1-2. In this case, the coupling between the battery pack 40 and the battery pack panel 10 may apply bolting fastening or welding.

Finally, the fixing member 30 is inserted into the insertion channel 21-2 formed in the mounting arm 21 of the plastic hinge bracket 20 to pass through the pin hole 22-1 of the seating flange 22 to be fastened to the side sill 130 and is mounted to the lower portion of the center floor panel 120 by using the vehicle body frame 110 of the vehicle 100 as the battery pack mounting module 1.

Therefore, the fixing member 30 is fastened to each of the left and right plastic hinge brackets 20-1, 20-2 of the panel-bracket-battery assembly 1-2 so as to be mounted to the lower portion of the center floor panel 120 of the vehicle body frame no of the vehicle 100 with the battery pack mounting module 1.

In particular, referring to the battery pack side surface portion structure of a cross section A-A in FIG. 6, the side sill 130 forming the side surface portion of the battery pack 40 is fixed to the plastic hinge bracket 20 via the fixing member 30, and if the avoidance behavior is performed, the side sill extruded material 130-1 may not be applied.

While designing a possible range of avoidance behavior, the side sill 130 may also be reinforced with the side sill extruded material which absorbs/buffers the collision energy by using the bending deformation in a state where there is no change in the side sill structure, if necessary.

As described above, the battery pack side surface portion structure of the downward movement spacing type battery pack mounting module 1 breaks a method of penetrating the extruded material formed horizontally among the side sill extruded materials formed vertically/horizontally as before to be mounted to the vehicle body with a bolt, thereby eliminating the cost/weight competitiveness reduction problem and the side sill space limitation problem caused by the extruded material, and eliminating the design limitation problem of the EV and the MHEV.

In particular, if the downward movement spacing type battery pack mounting module 1 is applied to the plastic hinge structure of the EV, the collision space may be significantly secured as compared with the existing side sill extruded material type non-avoidance behavior structure, thereby dramatically eliminating the aluminum extruded material for side collision reinforcement and securing more potential for the reduction in the cost/weight and the side collision for each vehicle grade.

Referring to FIG. 7, the side collision force applied by the side collision object indicated as a barrier 200 pushes the side sill 130 to deliver the collision amount to the center floor panel 120.

Subsequently, the battery pack 40 starts the downward movement (that is, rebound behavior) from the intrusion of the side sill 130, and the mounting arm 21 of the plastic hinge bracket 20 receives the downward movement force of the battery pack 40 from the plastic hinge B, thereby being deformed while forming the rebound avoidance behavior trajectory by using the plastic hinge A as the rotation center.

As a result, the rebound avoidance behavior trajectory of the plastic hinge bracket 20 induces to perform the battery pack avoidance behavior which moves by the battery pack lateral movement distance (L) while the battery pack 40 moves downward by the battery pack downward movement distance (R) before the pushed side sill 130 contacts the battery pack 40.

Referring to the side collision simulation for the downward movement spacing type battery pack mounting module 1 in FIG. 8, the side collision simulation shows that the downward movement spacing type battery pack mounting module 1 is evaluated in performance by being set as ① an intrusion start state of the side sill 130 due to the intrusion of the barrier 200->② a downward movement start state of the battery pack 40 due to the start of deformation of the plastic hinges A, B of the plastic hinge bracket 20->③ an avoidance behavior completion state of the battery pack 40 from the intrusion of the side sill 130 when the deformation of the plastic hinges A, B of the plastic hinge bracket 20 are completed. Here, the "->" means the simulation proceeding process.

For example, the respective meanings of the ① step, ② step, and ③ step of the side collision simulation are as follows.

In the step ①, since it is the time point when the side collision is started, the side sill 130 starts to intrude into the vehicle by the barrier 200, and the widthwise intrusion force of the side sill 130 for the width direction (Y) of the vehicle starts to deform the plastic hinges A, B of the plastic hinge bracket 20.

Subsequently, in the step ②, when the mounting arm 21 rotates with the mounting arm length due to the deformation of the plastic hinges A, B of the plastic hinge bracket 20 to start the rebound avoidance behavior trajectory, the battery pack 40 starts to move downward only having the degree of downward freedom in a state which has been mounted under the center floor panel 120 to constrain where the degree of freedom leftward/rightward/upward.

Finally, in the step ③, when the deformation of the plastic hinges A, B according to the geometry of the plastic hinge bracket 20 to which the Equation 15 has been applied are completed, the battery pack 40 completely performs the avoidance behavior downward from the side sill through the rotation of the mounting arm 21. As a result, the battery pack 40 disconnects the contact relationship between the battery pack 40 and the side sill 130 according to the side collision by the battery pack avoidance behavior performed sufficiently through the battery downward movement distance (R) and the battery pack lateral movement distance (L).

In the present disclosure, the movement of the plastic hinge bracket 20 is the result of the movement of the left and right plastic hinge brackets 20-1, 20-2. When the side sill is intruded by the collision to the left side in FIG. 8, the battery pack avoidance behavior by the plastic hinges A, B of the left plastic hinge bracket is possible within the range allowed by the right plastic hinge bracket, and vice versa.

As described above, the downward movement spacing type battery pack mounting module 1 applied to the vehicle 100 according to the present embodiment may include the plastic hinge bracket 20 which is fixed to the battery pack panel 10 which places the battery pack 40 and the side sill 130 in the mounting space secured under the center floor panel 120, and avoids the contact between the battery pack and the side sill in the state where the side sill has been intruded by the battery pack downward/lateral movements of the rebound avoidance behavior trajectory induced by the plastic hinge deformation by the mounting arm length of the plastic hinges A, B, thereby sufficiently preventing the damage to the battery pack even without the existing side sill extruded material, and in particular, may prevent the battery pack from being completely detached from the vehicle body frame 110, more specifically, the center floor panel from the front and rear collisions as well as the side collision applied from the outside, thereby being advantageous to satisfy the High Voltage Safety Regulation FMVSS 301 for the eco-friendly vehicle such as the EV/the MHEV.

What is claimed is:

1. A battery pack mounting module for a vehicle, the battery pack mounting module comprising:
   a seating flange fixed to a lower portion of a side sill;
   a fixing flange fixed to a battery pack panel under a battery pack;
   a mounting arm positioned between the seating flange and the fixing flange; and
   a plastic hinge A and a plastic hinge B formed at both sides of the mounting arm, wherein when a collision occurs on a side surface of the vehicle, the battery pack is configured to perform a downward movement by deformation of the plastic hinge A and the plastic hinge B to induce an avoidance behavior trajectory by a rotation motion of the mounting arm to avoid a collision between the battery pack and the side sill.

2. The battery pack mounting module of claim 1, wherein the plastic hinge A is positioned between the seating flange and the mounting arm.

3. The battery pack mounting module of claim 1, wherein the plastic hinge B is positioned between the fixing flange and the mounting arm.

4. The battery pack mounting module of claim 1, wherein a length of the mounting arm is configured to be used as a radius of the rotation motion.

5. The battery pack mounting module of claim 1, further comprising a bent arm bent from the seating flange in a ground direction of the vehicle to form a certain length, wherein a distance of the downward movement of the battery pack is increased by a length of the bent arm.

6. The battery pack mounting module of claim 5, wherein when the collision occurs on the side surface of the vehicle, the battery pack is configured to additionally move laterally, and a lateral movement distance of the battery pack is a relative distance at which the side sill has moved laterally toward the battery pack.

7. The battery pack mounting module of claim 6, wherein:
   the avoidance behavior trajectory is configured to apply, as design parameters, a battery pack height (H), the lateral movement distance (L) of the battery pack, the distance of the downward movement (R) of the battery pack, a plastic hinge avoidance behavior length (C), and a battery pack rotation allowable angle ($\theta$); and
   the lateral movement distance (L) of the battery pack and the distance of the downward movement (R) of the battery pack at which the battery pack is configured to perform the avoidance behavior trajectory from the side sill are calculated by applying $$C\cos\theta + C\sin\theta\tan\frac{\theta}{2} > H,$$

respectively.

8. The battery pack mounting module of claim 7, wherein:
   the plastic hinge avoidance behavior length (C) is classified into a side sill spacing length ($C_1$), which is a distance from the lower portion of the side sill to the plastic hinge A, and a mounting arm length ($C_2$); and
   the lateral movement distance (L) of the battery pack, the distance of the downward movement (R) of the battery pack, the side sill spacing length ($C_1$), and the mounting arm length ($C_2$) at which the battery pack may perform the avoidance behavior trajectory from the side sill
are calculated as design application variables by applying $$C_1 + C_2\left(\cos\theta + \sin\theta\tan\frac{\theta}{2}\right) > H.$$

9. A battery pack mounting module for a vehicle, comprising:
   a seating flange fixed to a lower portion of a side sill;
   a fixing flange fixed to a battery pack panel under a battery pack;
   a mounting arm positioned between the seating flange and the fixing flange; and
   a plastic hinge A and a plastic hinge B formed at both sides of the mounting arm,
   wherein when a collision occurs on a side surface of the vehicle, the battery pack is configured to perform a downward movement by deformation of the plastic hinge A and the plastic hinge B while the side sill is configured to perform a lateral movement in a vehicle width direction to induce an avoidance behavior trajectory by a rotation motion of the mounting arm so as to avoid a collision between the battery pack and the side sill.

10. The battery pack mounting module of claim 9, wherein a distance of the lateral movement of the side sill is a relative distance the battery pack has moved laterally toward the side sill.

11. The battery pack mounting module of claim 10, wherein:
   the avoidance behavior trajectory is configured to apply, as design parameters, a battery pack height (H), a distance of the lateral movement (L) of the battery pack, a distance of the downward movement (R) of the battery pack, a plastic hinge avoidance behavior length (C), and a battery pack rotation allowable angle ($\theta$); and
   the distance of the lateral movement (L) of the battery pack and the distance of the downward movement (R) of the battery pack at which the battery pack is configured to perform the avoidance behavior trajectory from the side sill are calculated by applying $$C\cos\theta + C\sin\theta\tan\frac{\theta}{2} > H,$$

respectively.

12. The battery pack mounting module of claim ii, wherein:
   the plastic hinge avoidance behavior length (C) is classified into a side sill spacing length ($C_1$), which is a distance from the lower portion of the side sill to the plastic hinge A, and a mounting arm length ($C_2$); and
   the distance of the lateral movement (L) of the battery pack, the distance of the downward movement (R) of the battery pack, the side sill spacing length ($C_1$), and the mounting arm length ($C_2$) at which the battery pack is configured to perform the avoidance behavior trajectory from the side sill are calculated as design application variables by applying $$C_1 + C_2\left(\cos\theta + \sin\theta\tan\frac{\theta}{2}\right) > H.$$

13. A battery pack mounting module for a vehicle, comprising:
   a seating flange fixed to a lower portion of a side sill;
   a fixing flange fixed to a battery pack panel under a battery pack;
   a mounting arm positioned between the seating flange and the fixing flange;
   a bent arm bent from the seating flange in a ground direction of the vehicle to form a certain length;
   a plastic hinge A formed at a first side of the mounting arm, wherein the plastic hinge A is positioned between the bent arm and the mounting arm and is positioned at an outermost surface in a vehicle width direction extending from the seating flange; and
   a plastic hinge B formed at a second side of the mounting arm,
   wherein, when a collision occurs on a side surface of the vehicle, the battery pack is configured to perform a downward movement by deformation of the plastic hinge A and the plastic hinge B to induce an avoidance behavior trajectory by a rotation motion of the mounting arm so as to avoid a collision between the battery pack and the side sill.

14. The battery pack mounting module of claim 13, wherein when the collision occurs on the side surface of the vehicle, the battery pack is configured to additionally perform lateral movement, and a distance of the lateral movement (L) is a relative distance the side sill has moved laterally toward the battery pack.

15. The battery pack mounting module of claim 14, wherein:
   the avoidance behavior trajectory is configured to apply, as design parameters, a battery pack height (H), the distance of the lateral movement (L) of the battery pack, a distance of the downward movement (R) of the battery pack, a plastic hinge avoidance behavior length (C), and a battery pack rotation allowable angle ($\theta$); and
   the distance of the lateral movement (L) of the battery pack and the distance of the downward movement (R) of the battery pack at which the battery pack is configured to perform the avoidance behavior trajectory from the side sill are calculated by applying $$C\cos\theta + C\sin\theta\tan\frac{\theta}{2} > H,$$

respectively.

16. The battery pack mounting module of claim 15, wherein:
   the plastic hinge avoidance behavior length (C) is classified into a side sill spacing length ($C_1$), which is a distance from the lower portion of the side sill to the plastic hinge A, and a mounting arm length ($C_2$); and
   the distance of the lateral movement (L) of the battery pack, the distance of the downward movement (R) of the battery pack, the side sill spacing length ($C_1$), and the mounting arm length ($C_2$) at which the battery pack is configured to perform the avoidance behavior trajectory from the side sill are calculated as design application variables by applying $$C_1 + C_2\left(\cos\theta + \sin\theta\tan\frac{\theta}{2}\right) > H.$$

17. A battery pack mounting module for a vehicle, comprising:
   a seating flange fixed to a lower portion of a side sill;
   a fixing flange fixed to a battery pack panel under a battery pack;
   a mounting arm positioned between the seating flange and the fixing flange;
   a plastic hinge A formed at a first side of the mounting arm and positioned between the seating flange and the mounting arm at an outermost surface in a vehicle width direction extending from the seating flange; and
   a plastic hinge B formed at a second side of the mounting arm,
   wherein when a collision occurs on a side surface of the vehicle, the battery pack is configured to perform a downward movement by deformation of the plastic hinge A and the plastic hinge B while the side sill is configured to perform a lateral movement in the vehicle width direction, to induce an avoidance behavior trajectory by a rotation motion of the mounting arm so as to avoid a collision between the battery pack and the side sill.

18. The battery pack mounting module of claim 17, wherein a distance of the lateral movement of the side sill is a relative distance the battery pack has moved laterally toward the side sill.

19. The battery pack mounting module of claim 18, wherein:
   the avoidance behavior trajectory is configured to apply, as design parameters, a battery pack height (H), a distance of a lateral movement (L) of the battery pack, a distance of the downward movement (R) of the battery pack, a plastic hinge avoidance behavior length (C), and a battery pack rotation allowable angle ($\theta$); and
   the distance of the lateral movement (L) of the battery pack and the distance of the downward movement (R) of the battery pack at which the battery pack is configured to perform the avoidance behavior trajectory from the side sill are calculated by applying $$C\cos\theta + C\sin\theta\tan\frac{\theta}{2} > H,$$

respectively.

20. The battery pack mounting module of claim 19, wherein:
   the plastic hinge avoidance behavior length (C) is classified into a side sill spacing length ($C_1$), which is a distance from the lower portion of the side sill to the plastic hinge A, and a mounting arm length ($C_2$); and
   the distance of the lateral movement (L) of the battery pack, the distance of the downward movement (R) of the battery pack, the side sill spacing length ($C_1$), and the mounting arm length ($C_2$) at which the battery pack is configured to perform the avoidance behavior trajectory from the side sill are calculated as design application variables by applying $$C_1 + C_2\left(\cos\theta + \sin\theta\tan\frac{\theta}{2}\right) > H.$$

* * * * *